United States Patent [19]
Goto et al.

[11] Patent Number: 5,965,101
[45] Date of Patent: *Oct. 12, 1999

[54] PROCESS FOR PRODUCING HYDROGEN PEROXIDE

[75] Inventors: Fumisato Goto; Kozo Tanaka; Toshio Sasaki, all of Tsukuba, Japan

[73] Assignee: Sumitomo Chemical Company, Limited, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/792,064

[22] Filed: Jan. 29, 1997

[30] Foreign Application Priority Data

Jan. 30, 1996 [JP] Japan .................................. 8-014121
Apr. 26, 1996 [JP] Japan .................................. 8-107471

[51] Int. Cl.⁶ .................................................. C01B 15/01
[52] U.S. Cl. ........................................................ 423/584
[58] Field of Search .......................................... 423/584

[56] References Cited

U.S. PATENT DOCUMENTS

| | | |
|---|---|---|
| 4,009,252 | 2/1977 | Izumi et al. ............................ 423/584 |
| 4,128,627 | 12/1978 | Dyer et al. . |
| 4,389,390 | 6/1983 | Dalton, Jr. et al. ...................... 423/584 |
| 4,889,705 | 12/1989 | Gosser ................................... 423/584 |
| 5,104,635 | 4/1992 | Kanada et al. .......................... 423/584 |

FOREIGN PATENT DOCUMENTS

| | | |
|---|---|---|
| 0117306 | 5/1984 | European Pat. Off. . |
| 0132294 | 1/1985 | European Pat. Off. . |
| 0492064 | 7/1992 | European Pat. Off. . |
| 55-18646 | 2/1980 | Japan . |
| B55-18646 | 5/1980 | Japan . |
| 56-47121 | 4/1981 | Japan . |
| B56-47121 | 11/1981 | Japan . |
| 57-92504 | 6/1982 | Japan . |
| A57-92506 | 6/1982 | Japan . |
| 63-156005 | 6/1988 | Japan . |
| 123401 | 1/1989 | Japan . |
| B64-23401 | 5/1989 | Japan . |

*Primary Examiner*—Wayne Langel
*Attorney, Agent, or Firm*—Stevens, Davis, Miller & Mosher, L.L.P.

[57] ABSTRACT

A process for producing hydrogen peroxide which comprises reacting hydrogen and oxygen in a reaction medium containing a halide of platinum group metal. The process is far simplified and the produced amount of hydrogen peroxide per the halide of platinum group metal is large.

8 Claims, No Drawings

PROCESS FOR PRODUCING HYDROGEN PEROXIDE

BACKGROUND OF THE INVENTION

1. Field of the Invention

The present invention relates to a process for producing hydrogen peroxide. Furthermore this invention relates to a process for producing hydrogen peroxide by reacting hydrogen and oxygen directly.

2. Description of the Related Art

Hydrogen peroxide is one of the most important industrial products having wide variety of uses, such as bleaching agents (for papers/pulps and natural fibers), industrial chemicals (oxidizing agents, plasticizers, rubber chemicals, and reducing agents for pollution processing), medical supplies (oxidizing agent), foods (bleaching sterilization agents for processed marine products, other various bleaching agents) and the like.

At present, the most general process for industrial production of hydrogen peroxide is the autoxidation which uses alkyl anthraquinone. However, the process needs many steps, such as reduction and oxidation of alkyl anthraquinone, and extraction separation, purification and concentration of hydrogen peroxide produced, and the process becomes complicated. Moreover, loss of alkyl anthraquinone and degradation of a reduction catalyst, etc. have been a problem.

In order to solve these problems, conventionally, hydrogen and oxygen are contacted in an aqueous medium in the presence of a platinum group metal supported catalyst to produce hydrogen peroxide directly. (JP-B 55-18646, JP-B 56-47121, JP-B 1-23401, JP-A63-156005, etc.). In the process, it has been used a solution to which acid and inorganic salt is added as a reaction medium.

For example, JP-A 63-156005 describes that hydrogen peroxide is produced in high concentration using a metal catalyst supporting a platinum group metal on a support material, by reacting hydrogen and oxygen in aqueous medium under a high pressure condition. In the process, however, it is necessary to add an acid in high concentration, and to add a compound which dissociates to generate halogen ion, for example, sodium bromide.

JP-A 57-92506 describes that ketone, ether, ester, amide, etc. can be used as a reaction medium, and methanol is excellent among them. However, the catalyst system used here is a metal supporting a platinum group metal on a support material, an acid, and a halogen ion. And to depress the decomposition of hydrogen peroxide, it is necessary to make formaldehyde exist together in methanol. Therefore, the process requires the step of adding these compounds, and in some cases the step of removing formaldehyde, and becomes disadvantageous industrially.

SUMMARY OF THE INVENTION

The object of the invention is to provide a process for producing high-concentration hydrogen peroxide in that the decomposition of hydrogen peroxide is depressed even if neither any one of the additive agents, such as acid, halogen ion and formaldehyde is added.

In view of the aforementioned circumstances, the present inventors have made an intensive research on a process for producing hydrogen peroxide by reacting hydrogen and oxygen directly in a reaction medium, and as a result, completed the invention. That is, the invention relates to a process for producing hydrogen peroxide by reacting hydrogen and oxygen in a reaction medium containing a halide of platinum group metal.

DETAILED DESCRIPTION OF THE INVENTION

The platinum group metal in the halide of the platinum group metal to be used in this invention, includes rhodium, iridium, platinum, palladium and the like. Platinum and palladium are preferable and palladium is more preferable.

The halide includes a fluoride, a chloride, a bromide and an iodide. A chloride and a bromide are preferable. The halide of such platinum group metal, includes rhodium chloride, rhodium bromide, iridium chloride, iridium bromide, platinum chloride, platinum bromide, palladium fluoride, palladium chloride, palladium bromide, palladium iodide, trans-dichlorodiamminepalladium and the like. Platinum bromide, platinum chloride, palladium chloride, palladium bromide, and trans-dichlorodiamminepalladium are preferable, and palladium chloride, palladium bromide and trans-dichlorodiamminepalladium are especially preferable.

In this invention, a reaction medium to be used is, for example, water, an organic compound which is liquid in a reaction system, and a mixture thereof. The organic compound to be used, includes alcohol, ketone, ether, ester, amide and the like. As a reaction medium to be used in the invention, water and alcohol are preferable. Alcohol alone or mixed-solution of alcohol and water is more preferable. In the case of the mixed-solution, it is desirable to include alcohol 80% or more by volume, and more preferably 90% or more.

Examples of the alcohols include alcohols having 1 to 8 carbon atoms, preferably 1 to 4 carbon atoms, such as methanol, ethanol and isopropyl alcohol; and glycols such as ethylene glycol. These alcohols can be used alone or as a mixture thereof. Among them, methanol and ethanol are preferable, and methanol is more preferable.

In this invention, hydrogen peroxide can be obtained in high concentration without adding acids. However, in case that the existence of acids does not cause any problems, acids such as sulfuric acid, hydrochloric acid, phosphoric acid and the like., may be added.

Although the amount of the halide of platinum group metal used here is not restricted, usually it is 1 mg or more, preferably 10 mg or more to 100 ml of reaction liquid.

The shape of the halide of platinum group metal may be such as fine powder or pellets, and fine powder is preferable. The surface area of the halide is, preferably, from 0.01 to 10000 $m^2/g$.

In this invention, the halide of platinum group metal can be used alone or by supporting on a suitable support material. In case of supporting, generally, the activity per metal weight is higher.

The support material includes, alumina, silica, titania, magnesia, zirconia, ceria, zeolite, graphite, active charcoal, silica gel, hydrated silic acid, silicon carbide and the like. Among them, alumina, silica, titania, zeolite, graphite and active charcoal are preferable.

As for the supporting method, for example, there is a method of suspending a support material in a solution of a halide of platinum group metal and drying by evaporation. However, the supporting method is not limited to this.

As the reaction method for this invention, a continuous method and a batch method are both possible, and as the reaction equipment, a suspension bed system or a fixed bed system can be used.

For example, the reaction of this invention can be carried out by the method of putting the halide of platinum group metal into a reaction medium and bubbling the gas of hydrogen and oxygen.

In the above method, a solvent which is not miscible with a reaction medium may be added further for the purpose of making a prolonged contact of the reaction gas bubbles with the reaction medium, and the reaction is executed under strong stirring.

As such a solvent, for example, when methanol is used for a reaction medium, octane and the like can be used. Although the amount of the solvent to be used is not restricted unless the reaction is obstructed, it is preferably used in 80% or less by volume and more preferably 70% or less.

The partial pressure ratio of oxygen to hydrogen is in the range of from 1/50 to 50/1.

The reaction can be carried out also by diluting with inert gas or by using air instead of oxygen. And it is preferable to react out of the explosion range on safety.

Generally, the reaction temperature is in the range of 5–70° C., and more preferably in the range of 10–50° C.

Although the reaction pressure is not especially limited, it is in the range of atmospheric pressure –150 ($kg/cm^2 \cdot G$) and more preferably in the range of 5–50 ($kg/cm^2 \cdot G$).

Hereafter, this invention is further explained in more detail below referring to Examples and Comparative Examples; however, this invention should not be interpreted to be limited to the Examples.

The concentration of hydrogen peroxide in Examples 1–4 and Comparative Examples 1–2, is determined by the titration method using 0.02 mol/l potassium permanganate solution for volumetric analysis (available from Wako Pure Chemical Industries, Ltd.) under sulfuric acid acidity (0.2 N) condition at room temperature. For the titration, the potentiometric automatic titrator AT-310 manufactured by KYOTO ELECTRONICS MANUFACTURING CO.,LTD. is used.

The concentration of hydrogen peroxide in Examples 5–15 and Comparative Example 3, is determined by a titration method wherein an excess of potassium iodide (available from Wako Pure Chemical Industries, Ltd.) is added under a sulfuric acid acidity (0.2N) condition and isolated iodine was titrated with 0.1 mol/l sodium thiosulfate solution for volumetric analysis (available from Wako Pure Chemical Industries, Ltd.) at room temperature. For the titration, the potentiometric automatic titrator AT-310 manufactured by KYOTO ELECTRONICS MANUFACTURING CO.,LTD. is used.

The specific surface area is determined by using a specific surface area measuring apparatus (made by Micromeritics Instruments Co.: Flow Sorb II2300 type).

EXAMPLE 1

An inner vessel (300 ml of inner volume) made from glass containing 30 mg of $PdBr_2$ (available from NAKCALAI TESQUE, INC.: 0.4 $m^2$/g of specific surface area) and 120 g of ion-exchanged water as the reaction medium, was equipped to an autoclave (400 ml of inner volume).

Hydrogen gas and oxygen gas are flowed into the reaction medium, respectively, by the flow rate of 80 ml/min and 800 ml/min through gas blowing pipes. Nitrogen gas was introduced for dilution by the flow rate of 2500 ml/min into the gas phase for safety.

The inner pressure of the autoclave was kept 9 $kg/cm^2 \cdot G$ and the temperature of the reaction medium was kept about 20° C. by external cooling set to 15° C.

The concentration of hydrogen peroxide in the reaction solution after 2 hours from the start of the reaction was 0.05 wt %. The produced amount of hydrogen peroxide per 1 mg of $PdBr_2$ was 0.06 mmol.

Comparative Example 1

In the same manner as in Example 1, except having used 30 mg of Pd powder(available from TANAKA KIKIN-ZOKU KOGYO K.K.: specific surface area 10.8 $m^2$/g) in place of $PdBr_2$, the reaction was carried out.

Hydrogen peroxide concentration in the reaction solution after 2 hours from the start of the reaction was below the detection limit (0.00 wt %).

EXAMPLE 2

In the same manner as in Example 1, except having used the mixture of 6 g of aqueous solution of 1N $H_2SO_4$ and 114 g of ion-exchanged water as the reaction medium, the reaction was carried out.

Hydrogen peroxide concentration in the reaction solution after 2 hours from the start of the reaction was 0.09wt %. The produced amount of hydrogen peroxide per 1 mg of $PdBr_2$ was 0.10 mmol.

Comparative Example 2

In the same manner as in Example 2, except having used 30 mg of Pd/C (available from N.E.Chemcat Corporation: specific surface area 800$m^2$/g) in place of $PdBr_2$, the reaction was carried out.

Hydrogen peroxide concentration in the reaction solution after 2 hours from the start of the reaction was below the detection limit (0.00 wt %).

EXAMPLE 3

In the same manner as in Example 1, except having used 30mg of $PdCl_2$ (available from Wako Pure Chemical Industries, Ltd.: specific surface area 0.4 $m^2$/g) in place of $PdBr_2$, the reaction was carried out.

Hydrogen peroxide concentration in the reaction solution after 2 hours from the start of the reaction was 0.05 wt %. The produced amount of hydrogen peroxide per 1 mg of $PdCl_2$ was 0.06 mmol.

EXAMPLE 4

In the same manner as in Example 1, except having used 30 mg of $Pd(NH_3)_2Cl_2$ (available from Aldrich Chemical Co., Inc.) in place of $PdBr_2$, the reaction was carried out.

Hydrogen peroxide concentration in the reaction solution after 2 hours from the start of the reaction was 0.09 wt %. The produced amount of hydrogen peroxide per 1 mg of $Pd(NH_3)_2Cl_2$ was 0.10 mmol.

EXAMPLE 5

In the same manner as in Example 1, except having used 120 ml of methanol as the reaction medium, the reaction was carried out.

Hydrogen peroxide concentration in the reaction solution after 2 hours from the start of the reaction was 0.15 wt %. The produced amount of hydrogen peroxide per 1 mg of $PdBr_2$ was 0.12 mmol.

EXAMPLE 6

In the same manner as in Example 5, except having used 30 mg of $PdCl_2$ (available from Wako Pure Chemical Industries, Ltd.: specific surface area 0.4 $m^2$/g) in place of $PdBr_2$, the reaction was carried out.

Hydrogen peroxide concentration in the reaction solution after 2 hours from the start of the reaction was 0.33 wt %. The produced amount of hydrogen peroxide per 1 mg of $PdCl_2$ was 0.26 mmol.

EXAMPLE 7

In the same manner as in Example 5, except having used 30 mg of $PtBr_2$ (available from ACROS ORGANICS) in place of $PdBr_2$, the reaction was carried out.

Hydrogen peroxide concentration in the reaction solution after 2 hours from the start of the reaction was 0.08 wt %. The produced amount of hydrogen peroxide per 1 mg of $PtBr_2$ was 0.06 mmol.

EXAMPLE 8

In the same manner as in Example 5, except having used 30 mg of $PtCl_2$ (available from Wako Pure Chemical Industries, Ltd.) in place of $PdBr_2$, the reaction was carried out.

Hydrogen peroxide concentration in the reaction solution after 2 hours from the start of the reaction was 0.02 wt %. The produced amount of hydrogen peroxide per 1 mg of $PtCl_2$ was 0.02 mmol.

EXAMPLE 9

In the same manner as in Example 5, except having used the mixture of 60 ml of ion-exchanged water and 60 ml of methanol as the reaction medium, the reaction was carried out.

Hydrogen peroxide concentration in the reaction solution after 2 hours from the start of the reaction was 0.06 wt %. The produced amount of hydrogen peroxide per 1 mg of $PdBr_2$ was 0.05 mmol.

EXAMPLE 10

In the same manner as in Example 5, except having used the mixture of 18 ml of ion-exchanged water and 102 ml of methanol as the reaction medium, the reaction was carried out.

Hydrogen peroxide concentration in the reaction solution after 2 hours from the start of the reaction was 0.11 wt %. The produced amount of hydrogen peroxide per 1 mg of $PdBr_2$ was 0.10 mmol.

EXAMPLE 11

In the same manner as in Example 5, except having used the mixture of 60 ml of methanol and 60 ml of n-octane as the reaction medium, the reaction was carried out.

Hydrogen peroxide concentration in the reaction solution after 2 hours from the start of the reaction was 0.39 wt %. The produced amount of hydrogen peroxide per 1 mg of $PdBr_2$ was 0.15 mmol.

EXAMPLE 12

In the same manner as in Example 5 except having used the mixture of 60 ml of ethylene glycol and 60 ml of n-octane as the reaction medium, the reaction was carried out.

Hydrogen peroxide concentration in the reaction solution after 2 hours from the start of the reaction was 0.07 wt %. The produced amount of hydrogen peroxide per 1 mg of $PdBr_2$ was 0.04 mmol.

EXAMPLE 13

In the same manner as in Example 5, except having used 120 ml of ethanol as the reaction medium, the reaction was carried out.

Hydrogen peroxide concentration in the reaction solution after 2 hours from the start of the reaction was 0.09 wt %. The produced amount of hydrogen peroxide per 1 mg of $PdBr_2$ was 0.07 mmol.

EXAMPLE 14

In the same manner as in Example 5, except having used 120 ml of isopropanol as the reaction medium, the reaction was carried out.

Hydrogen peroxide concentration in the reaction solution after 2 hours from the start of the reaction was 0.03 wt %. The produced amount of hydrogen peroxide per 1 mg of $PdBr_2$ was 0.02 mmol.

EXAMPLE 15

(1) Preparation of supported $PdBr_2$

Supported $PdBr_2$ on titanosilicate was prepared as follows.

$PdBr_2$ (available from NACALAI TESQUE,INC.)50 mg was dissolved in 1.5 g of hydrobromic acid (available from Wako Pure Chemical Industries, Ltd.; 47.0–49.0%) and diluted with 20 ml of ion-exchanged water, and 1 g of titanosilicate (available from N.E.Chemcat Corporation:Si/Ti atomic ratio =100) was suspended in the solution. After stirring one hour, it was vaporized and dried on a hot plate. After washing with ion-exchanged water and ethanol, filtrating, and drying at 100° C. for one hour in an oven, $PdBr_2$/titanosilicate (5 wt %-$PdBr_2$) was obtained.

(2) Preparation of hydrogen peroxide

In the same manner as in Example 5, except having used 30 mg of $PdBr_2$/titanosilicate (5 wt %-$PdBr_2$) obtained above (1), the reaction was carried out.

Hydrogen peroxide concentration in the reaction solution after 2 hours from the start of the reaction was 0.06 wt %. The produced amount of hydrogen peroxide was 0.04 mmol per 1 mg of $PdBr_2$/titanosilicate, and 0.83 mmol per 1 mg of $PdBr_2$.

Comparative Example 3

In the same manner as in Example 5, except having used 30 mg of Pd/C (available from N.E.Chemcat Corporation: Pd content 5%: specific surface area 800 $m^2$/g) in place of $PdBr_2$, the reaction was carried out.

Hydrogen peroxide concentration in the reaction solution after 2 hours from the start of the reaction was below the detection limit (0.00 wt %).

The process for producing hydrogen peroxide in this invention does not need the step of adding acids or halogen ions, and the reaction proceeds effectively by using a compound which is produced by few preparation steps, and the produced amount of hydrogen peroxide per the compound is large. Consequently, production of hydrogen peroxide is attained in far simplified process.

What is claimed is:

1. A process for producing hydrogen peroxide which comprises reacting hydrogen with oxygen in a reaction medium containing a halide of platinum group metal without adding acids, wherein the reaction medium is methanol alone.

2. The process for producing hydrogen peroxide according to claim 1, wherein the halide of platinum group metal is supported on a support material.

3. The process for producing hydrogen peroxide according to claim 1, wherein the platinum group metal is palladium or platinum.

4. The process for producing hydrogen peroxide according to claim 1, wherein the halide of platinum group metal is a chloride or a bromide of palladium or platinum.

5. The process for producing hydrogen peroxide according to claim 1, wherein the halide of platinum group metal is a chloride or a bromide of palladium.

6. The process for producing hydrogen peroxide according to claim 2, wherein the platinum group metal is palladium or platinum.

7. The process for producing hydrogen peroxide according to claim 2, wherein the halide of platinum group metal is a chloride or a bromide of palladium or platinum.

8. The process for producing hydrogen peroxide according to claim 2, wherein the halide of platinum group metal is a chloride or a bromide of palladium.

* * * * *